Sept. 27, 1938.  J. T. HARBES  2,131,281
TRAILER JACK
Filed Feb. 24, 1937   2 Sheets-Sheet 1

INVENTOR,
John T. Harbes.
BY Hovey & Hamilton
ATTORNEYS.

Sept. 27, 1938.  J. T. HARBES  2,131,281
TRAILER JACK
Filed Feb. 24, 1937   2 Sheets-Sheet 2
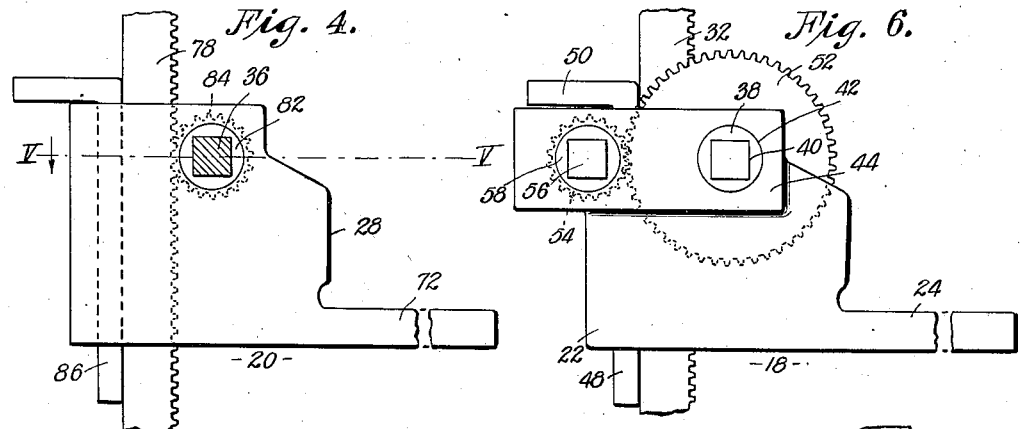
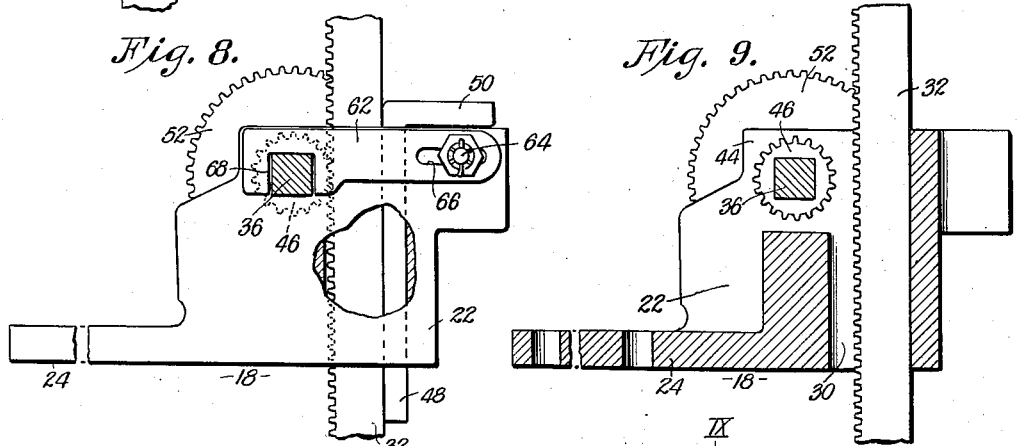
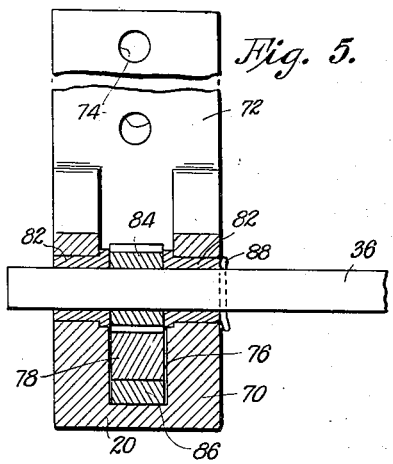
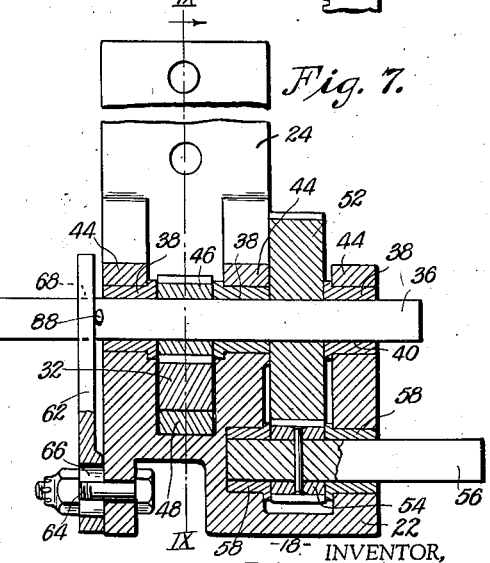
INVENTOR,
John T. Harbes.
BY Hovey & Hamilton,
ATTORNEYS.

Patented Sept. 27, 1938

2,131,281

UNITED STATES PATENT OFFICE 2,131,281

TRAILER JACK

John T. Harbes, Kansas City, Mo.

Application February 24, 1937, Serial No. 127,391

7 Claims. (Cl. 254—86)

This invention relates to improvements in vehicle jacks and particularly to trailer jacks permanently attached to the vehicle and operable to raise or lower the vehicle and support it in any desired position.

One of the principal objects of this invention is the provision of a vehicle, such as a trailer, having a pair of supporting wheels at one end thereof, and provided with jacks at the other end, having means whereby the jack stems may be independently lowered to contact the supporting surface therebeneath and then simultaneously operated to raise both sides of the trailer at a uniform rate of speed.

A further object of the present invention is the provision of simple and easily operable jack means adapted to be positioned substantially above the floor line of the trailer when in the inoperative position.

Another object of the invention is the provision of a pair of jacks having a common driving shaft, adjustable longitudinally to permit said jacks to be positioned at any desired spaced apart relation.

Further objects are simplicity and sturdiness of construction, ease and dispatch of operation, and adaptability for use on smooth or irregular surfaces.

Other objects will appear during the course of the specification, referring to the drawings, wherein:

Fig. 4 is an enlarged, sectional view of the outside jack, taken on line IV—IV of Fig. 3, partly broken away.

Fig. 5 is a sectional view, taken on line V—V of Fig. 4.

Fig. 6 is an enlarged, side elevation of the inside jack.

Fig. 7 is an enlarged, sectional view of the inside jack, taken on line VII—VII of Fig. 2.

Fig. 8 is a sectional view, taken on line VIII—VIII of Fig. 2, showing the inner jack with the housing thereof partly broken away, and, Fig. 9 is a vertical section, taken on line IX—IX of Fig. 7, with the insert removed and the rack bar moved to the inoperative position.

Figure 1:
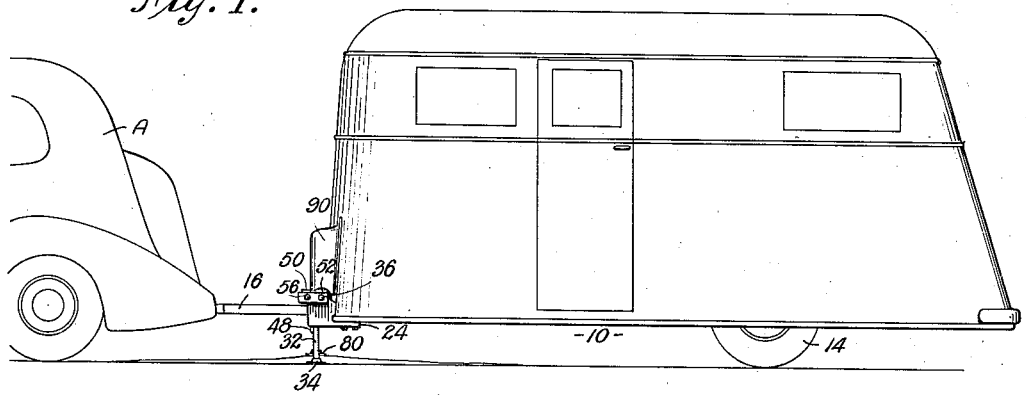
Figure 1 is a side elevation of a trailer, with trailer jacks in position, embodying this invention.

In the preferred embodiment of this invention as illustrated in the accompanying drawings, numeral 10 designates a trailer, having a body 12, with a pair of wheels 14 mounted adjacent the rear end thereof. A hitch 16 is provided at the front end of the trailer and serves for attaching the trailer to a motor vehicle A for transportation.

Secured to the body structure is a pair of jacks 18 and 20, which serve to support the front end of the trailer when the same is detached from the motor vehicle. Furthermore, these jacks are adapted to be retracted to the raised position so that they will clear the roadway as the trailer is being transported. The jacks as shown are attached at the end of the body in spaced apart relation so as to support the forward end of the trailer in such a manner as to preclude any side rocking thereof. The inner jack is attached to one side of the trailer, while the outer jack 20 is secured to the opposite side thereof.

Referring now to the inner jack 18, it will be observed that the jack housing 22 is provided with a horizontal ledge 24, positioned and secured by bolts 26 to the under side of the body structure, with an abutment 28 of the housing resting against the vertical portion of the body. A vertical passageway 30 extends through the housing and is adapted to receive a rack bar 32 which carries a foot member 34. Extending transversely through housing 22 is a squared shaft 36. This shaft is provided with suitable bushings 38, having a squared hole 40 to receive the shaft and a circular outer contour 42 for rotation in the bearing members 44.

Mounted on shaft 36 intermediate two of the bearing members 44, and in alignment with rack bar 32, is a gear 46. This rack bar 32 is held in mesh with gear 46 by means of an insert 48, which is adapted to be positioned in passageway 30 with one side thereof resting against the back side of rack bar 32. This insert 48 is provided at its upper end with a transverse projection 50, which limits the downward movement of the insert and also serves as a hand hold, by means of which the insert may be removed so that the rack bar 32 can be positioned away from gear 46 for free vertical movement in passageway 30. It will be noted that in Fig. 8 the insert is shown in place to hold the rack bar and gear in operative relation, while in Fig. 9 the insert has been removed and the rack bar is shown moved out of engagement with gear 46. It will be noted that this insert also serves as a guide for the rack bar and will secure it against lateral movement relative to the housing.

For purpose of rotating gear 46 with sufficient force to lift the trailer, a train of gears 52 and 54 are mounted as clearly shown in Fig. 7 at one side of housing 22. Gear 52 is preferably of greater diameter than gear 54 and is mounted on shaft 36 for rotation therewith. The gear 54 is in mesh with gear 52, and is secured to a short shaft 56 mounted in bushings 58, which in turn are mounted in the housing 22. Shaft 56 extends beyond said housing and is adapted to receive a crank 60, by means of which said train of gears is set in operation to drive shaft 36.

At the inner side of housing 22, a detent 62 is pivotally mounted thereto by means of bolt 64. This bolt passes through a slot 66, formed in the detent, thus permitting a longitudinal movement of the detent whereby the same may be positioned so that the squared notch 68 therein may be fitted over the squared shaft 36 to prevent rotation thereof. During the operation of shaft 36, this detent is moved out of engagement with the shaft and is permitted to hang downwardly from the supporting bolt. It will be observed that shaft 36 extends transversely of the trailer body and is rotatably mounted in housing 70 of jack 20. This housing is provided with a horizontally disposed ledge 72, having openings 74 formed therein through which bolts are passed to secure said housing in an operative position to the trailer body. An opening 76 is provided to extend vertically through said housing, and is adapted to receive a rack bar 78, having a depending foot member 80. Shaft 36 is provided with spaced-apart bushings 82, which permit the said shaft to be rotated.

Positioned intermediate bushings 82 is a gear 84, which is adapted to normally mesh with rack bar 78 for moving the rack bar vertically relative to housing 70. Positioned in opening 76 at the rear of the rack bar 78, is an insert 86 which serves as a guide for the rack bar, whereby the same is maintained in operative relation with gear 84.

To prevent longitudinal movement of shaft 36, cotter keys 88 are provided in said shaft at the adjacent inner sides of the jacks. In the operation of the jacks it will be considered that the operator desires to detach the trailer from the motor vehicle and maintain the floor of the trailer in a substantially horizontal plane. The trailer is first driven to a position on the ground so that the axis of the wheels 14 is in a substantially horizontal plane. The detent is then moved to disengage shaft 36 and the inserts 48 and 86 are withdrawn so as to permit the rack bars 32 and 78 to drop until the foot members 38 and 80 rest on the ground therebeneath. If desired to obtain a better footing, blocks or any other suitable member might be positioned beneath these foot members to increase the bearing surface.

Figure 2:
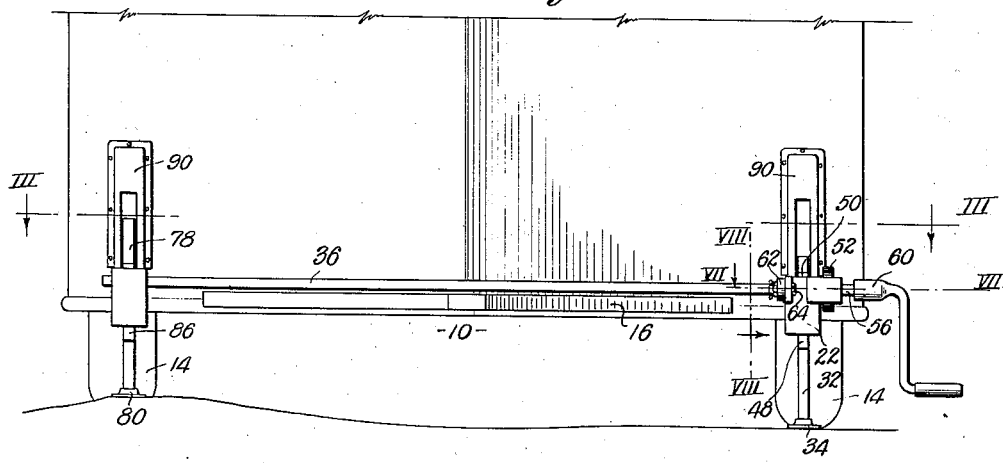
Fig. 2 is an end elevation of the trailer, with the jacks extended.
Figure 3:
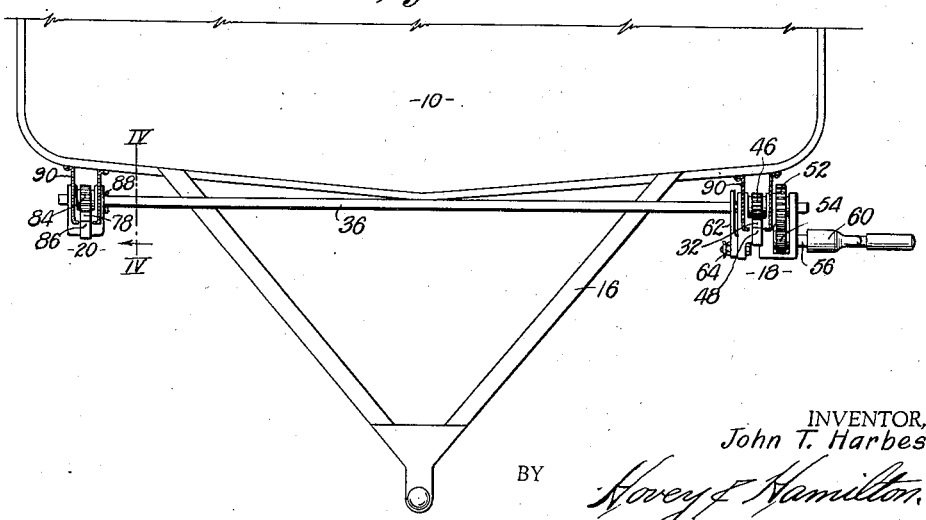
Fig. 3 is a sectional view of the jacks, taken on line III—III of Fig. 2 and the trailer shown in plan.

As shown in Fig. 2, the contour of the ground beneath said jacks may vary in elevation; however, both jacks will be positioned at the required starting point so that when the inserts 48 and 86 are placed to move the rack bars to engage their respective gears and the operator turns the crank 60, the jacks will move like distances and the trailer floor will be maintained in the initial horizontal position. When the operator has obtained the proper height of the floor, then the detent 62 can again be placed in the operative position to secure the shaft 36 against accidental movement.

Suitable shields 90 are secured to the trailer body and adapted to cover certain of the working parts of the jacks respectively In some trailers the jacks might be so positioned as to cause the jack parts to be positioned within the trailer and in such cases, the form of the shield would be varied in shape.

It is apparent that by means of this novel jack structure the trailer may be quickly and easily positioned for camping.

I am aware that many changes may be made and numerous details of construction may be varied through a wide range without departing from the principles of this invention, and I therefore do not propose limiting the patent therein, otherwise than necessitated by prior art.

Having thus described the invention, what is claimed as new and desired to be secured by Letters Patent is:

1. A jack for a trailer having a body and a pair of supporting wheels adjacent one end thereof comprising a pair of jack housings adjacent the other end thereof; a vertically adjustable rack bar in each of said jack housings; a transverse shaft having spaced apart gears adapted to respectively engage said rack bars; and means associated with each of said jacks operable to selectively release said rack bars from said gears to permit free movement thereof whereby different relative adjustments of the rack bars may be obtained.

2. A jack for a trailer having a body and a pair of supporting wheels adjacent one end thereof comprising a pair of jack housings adjacent the other end thereof; a vertically adjustable rack bar in each of said jack housings; a rotatably mounted transverse shaft having spaced apart gears adapted to respectively engage said rack bars; a detent adjustable to engage and prevent rotation of said shaft and secure said rack bars in fixed relative relation; and means associated with each of said jacks operable to selectively release said rack bars from said gears to permit free movement thereof.

3. A jack for a trailer having a body and a pair of supporting wheels adjacent one end thereof comprising a pair of jack housings adjacent the other end of said trailer; a vertically adjustable rack bar in each of said jack housings; a transverse shaft having spaced apart gears adapted to respectively engage said rack bars; a train of manually operable speed reducing gears associated with said shaft; and means associated with each of said jacks normally operable to selectively release said rack bars from said gears to permit free movement thereof.

4. A jack for a trailer having a body provided with a pair of supporting wheels adjacent the rear end thereof comprising a pair of jack housings secured in spaced apart relation adjacent the front end of said body; a vertically adjustable rack bar mounted in each of said housings; a transverse shaft having spaced apart gears rotatable therewith and adapted to engage respectively said rack bars; a removable insert positioned between said housings and bars respectively and adapted to normally maintain said gear rack in meshed relation with its respective gear; and a speed reducing means operable to drive said shaft.

5. A jack for a trailer having a body provided with a pair of supporting wheels adjacent the rear end thereof comprising a pair of jack housings secured in spaced apart relation adjacent the front end of said trailer body; a vertically adjustable rack bar mounted in each of said housings; a transverse shaft having spaced apart gears rotatable therewith and adapted to engage respectively said rack bars; a removable insert adapted to normally maintain said gear rack in meshed relation with its respective gear; and a detent adjustable to engage and secure said shaft against rotation and maintain said rack bars in a fixed relation to support one end of said trailer.

6. A jack for a trailer having a body provided with a pair of supporting wheels adjacent its rear end comprising a pair of jack housings secured in spaced apart relation adjacent the forward end of said body; a vertically adjustable member mounted in each of said housings; a transverse shaft mounted for rotation in said housings and geared to said vertically adjustable members whereby they are moved relative to the housing as said shaft is rotated; means for securing said shaft against rotation; and means including a spacing member positioned between said housings and each of said vertically adjustable members to hold them in operative relation with said geared shaft and being removable to permit an operation of said geared shaft and vertical adjustable members whereby they may be independently moved.

7. A jack for trailers having a plurality of vertically adjustable rack bars, means for manually operating all of said rack bars simultaneously and at the same rate of speed; means for securing said operating means against movement; and means to selectively disengage said rack bars from said operating means whereby they may be independently adjusted on a base of irregular surface.

JOHN T. HARBES.